United States Patent
Jwa

(10) Patent No.: US 10,694,044 B2
(45) Date of Patent: Jun. 23, 2020

(54) ELECTRONIC DEVICE AND CONTENT TRANSMITTING AND RECEIVING METHOD THEREOF

(71) Applicant: Samsung Electronics Co., Ltd., Gyeonggi-do (KR)

(72) Inventor: Chang Hyup Jwa, Jeju-do (KR)

(73) Assignee: Samsung Electronics Co., Ltd (KR)

( * ) Notice: Subject to any disclaimer, the term of this patent is extended or adjusted under 35 U.S.C. 154(b) by 548 days.

(21) Appl. No.: 15/271,565

(22) Filed: Sep. 21, 2016

(65) Prior Publication Data

US 2017/0085723 A1    Mar. 23, 2017

(30) Foreign Application Priority Data

Sep. 23, 2015  (KR) .......................... 10-2015-0134532

(51) Int. Cl.
*H04M 15/00* (2006.01)
*H04W 4/24* (2018.01)
*G06F 16/957* (2019.01)
*H04M 1/725* (2006.01)

(52) U.S. Cl.
CPC .......... *H04M 15/61* (2013.01); *G06F 16/957* (2019.01); *H04M 15/85* (2013.01); *H04M 15/852* (2013.01); *H04M 15/854* (2013.01); *H04M 15/858* (2013.01); *H04M 15/885* (2013.01); *H04W 4/24* (2013.01); *H04M 1/72561* (2013.01)

(58) Field of Classification Search
CPC ............. H04M 15/61; H04M 1/72583; H04M 15/858; H04M 15/854
See application file for complete search history.

(56) References Cited

U.S. PATENT DOCUMENTS

| | | | |
|---|---|---|---|
| 7,047,278 B2* | 5/2006 | Miyazawa | H04L 29/06 370/229 |
| 2004/0228285 A1* | 11/2004 | Moon | H04L 47/10 370/252 |
| 2007/0140123 A1* | 6/2007 | Fukui | H04L 47/10 370/235 |
| 2009/0310663 A1* | 12/2009 | Menon | H04L 43/026 375/225 |
| 2013/0151937 A1 | 6/2013 | Weber et al. | |
| 2014/0370847 A1* | 12/2014 | Neal | H04M 15/61 455/406 |
| 2015/0012613 A1* | 1/2015 | Wang | H04W 36/26 709/217 |

* cited by examiner

*Primary Examiner* — Marcus Hammonds
(74) *Attorney, Agent, or Firm* — The Farrell Law Firm, P.C.

(57) ABSTRACT

An electronic device is provided. The electronic device includes a communication module configured to communicate with an external electronic device and a processor configured to determine a size of content, transmit or receive the content at a first speed if the size of the content is less than a specific size, and transmit or receive the content at a second speed, which is slower than the first speed, if the size of the content is greater than or equal to the specific size.

16 Claims, 7 Drawing Sheets

ELECTRONIC DEVICE AND CONTENT TRANSMITTING AND RECEIVING METHOD THEREOF

PRIORITY

This application claims priority under 35 U.S.C. § 119(a) to Korean Patent Application Serial No. 10-2015-0134532, which was filed on Sep. 23, 2015 in the Korean Intellectual Property Office, the entire content of which is incorporated herein by reference.

BACKGROUND

1. Field of the Disclosure

The present disclosure generally relates to an electronic device, and more particularly, to an electronic device that transmits and receives content to and from an external electronic device and a content transmitting and receiving method thereof.

2. Description of the Related Art

With the development of electronic technologies, various types of electronic products have been developed and distributed. In particular, portable electronic devices, which have a variety of functions, such as a smart phone, a tablet personal computer (PC), and the like have been increasingly used.

Because of multiple functions of the electronic device, the electronic device is capable of providing various kinds of content and services, such as an e-mail, web surfing, photographing, gaming, messaging, a social network service (SNS), music, and the like, through an application.

A user of the above-described portable electronic device may use cellular data under contract with a communication company. The usage charge of the cellular data may be charged in proportion to the amount of cellular data consumed ("data usage") by the user. Alternatively, even though the user may have a contract to use a specific amount of the cellular data for a specific time period for a flat rate, an additional charge may occur when the user consumes cellular data over a limit.

SUMMARY

The present disclosure has been made to address at least the above-mentioned problems and/or disadvantages and to provide at least the advantages described below. Accordingly, an aspect of the present disclosure is to provide an electronic device that is capable of reducing cellular data usage of the portable electronic device and a content transmitting and receiving method of the electronic device.

In accordance with an aspect of the present disclosure, an electronic device includes a communication module configured to communicate with an external electronic device and a processor configured to determine the size of the content, to transmit or receive the content at a first speed if the size of the content is less than a specific size, and to transmit or receive the content at a second speed, which is slower than the first speed, if the size of the content is greater than or equal to the specific size.

In accordance with another aspect of the present disclosure, a content transmitting and receiving method of an electronic device includes determining the size of the content, transmitting or receiving the content at a first speed if the size of the content is less than a specific size and transmitting or receiving the content at a second speed, which is slower than the first speed, if the size of the content is greater than or equal to the specific size.

In accordance with another aspect of the present disclosure, an electronic device includes a communication circuit, a display, a processor electrically connected with the communication circuit and the display and a memory electrically connected with the processor. The memory stores instructions which, when executed, cause the processor to verify a size of at least one content to be received from an external electronic device or to be transmitted to the external electronic device by using the communication circuit, compare the size of the at least one content with a specific size, perform a first action associated with the transmission or reception if the size of the at least one content is greater than or equal to the specific size and perform a second action associated with the transmission or reception if the size of the at least one content is less than the specific size.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
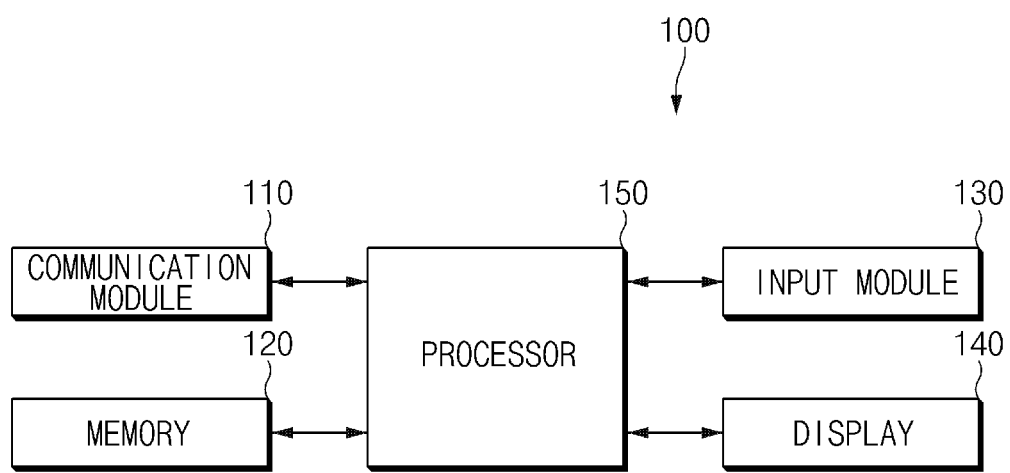
FIG. 1 is a block diagram illustrating a configuration of an electronic device according to various embodiments of the present disclosure.

Various embodiments of the present disclosure may be described with reference to accompanying drawings. Accordingly, those of ordinary skill in the art will recognize that modifications, equivalents, and/or alternatives of the various embodiments described herein may be made without departing from the scope and spirit of the present disclosure. With regard to description of drawings, similar elements may be marked by similar reference numerals.

In the present disclosure, the expressions "have", "may have", "include" and "comprise", or "may include" and "may comprise" as used herein indicate the existence of corresponding features (e.g., elements such as numeric values, functions, operations, or components) but do not exclude the presence of additional features.

In the present disclosure, the expressions "A or B", "at least one of A or/and B", or "one or more of A or/and B", and the like as used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Terms, such as "first", "second", and the like as used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" as used herein may be used interchangeably with, for example, the expressions "suitable for", "having the size to", "designed to", "adapted to", "made to" or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a general-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In various embodiments of the present disclosure, an electronic device may be a home appliance. The smart home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, and the like), a magnetic resonance angiography (MRA), a magnetic resonance imaging (MRI), a computed tomography (CT), a scanner, an ultrasonic device, and the like), a navigation device, a global navigation satellite system (GNSS), an event data recorder (EDR), a flight data recorder (FDR), a vehicle infotainment device, electronic equipment for vessels (e.g., a navigation system, a gyrocompass, and the like), avionics, a security device, a head unit for a vehicle, an industrial or home robot, an automatic teller machine (ATM), a point of sales (POS) terminal, or an Internet of Things (IoT) device (e.g., a light bulb, various sensors, an electric or gas meter, a sprinkler, a fire alarm, a thermostat, a streetlamp, a toaster, exercise equipment, a hot water tank, a heater, a boiler, and the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, and the like). In various embodiments of the present disclosure, an electronic device may be one or more combinations of the above-mentioned devices. An electronic device may be a flexible device. An electronic device is not limited to the above-mentioned devices, and may include new electronic devices with the development of new technology.

FIG. 1 is a block diagram illustrating a configuration of an electronic device according to various embodiments of the present disclosure.

Referring to FIG. 1, an electronic device 100 includes a communication module 110, a memory 120, an input module 130, a display 140, and a processor 150. The electronic device 100 according to various embodiments of the present disclosure may prevent unnecessary transmission or reception of content by controlling a speed (hereinafter "content transmission or reception speed"), at which content is transmitted or received.

According to an embodiment of the present disclosure, the communication module (or a communication circuit) 110 may communicate with an external electronic device (e.g., an external server). The communication module 110 may transmit and receive content (e.g., an image, a video, and the like) to and from the external electronic device over a network (e.g., a mobile communication network or an Internet network). The communication module 110 may include a cellular module, a wireless fidelity (Wi-Fi) module, a Bluetooth module, a near field communication (NFC) module, a global navigation satellite system (GNSS) module, and the like.

According to an embodiment of the present disclosure, the memory 120 may store content. The memory 120 may store content received from an external electronic device.

According to an embodiment of the present disclosure, the input module (or an input circuit) 130 may receive a user command. The input module 130 may receive a user command through a user interface provided from an application (e.g., a web browser, a synchronization (or backup) application). The input module 130 may receive a transmission cancel command or a reception cancel command for content of which a transmission or reception speed is reduced. The input module 130 may receive a speed restoration command for content of which a transmission or reception speed is reduced.

In an embodiment of the present disclosure, the input module 130 may include a touch sensor panel that senses a touch manipulation of a user or a pen sensor panel that senses a pen manipulation of a user. The input module 130 may sense a user manipulation input within a specific distance while indirectly making contact with the panel, as well as a user manipulation that directly makes contact with the panel (e.g., a touch sensor panel or a pen sensor panel).

The display 140 may display a user interface. For example, the display 140 may display a user interface that includes information associated with content, of which a transmission or reception speed is reduced.

The processor 150 may control overall operations of the electronic device 100. The processor 150 may include at least one processor. The processor 150 may control transmission or reception of content according to various embodiments of the present disclosure by controlling the communication module 110, the memory 120, the input module 130, and the display 140, respectively. The processor 150 (e.g., an application processor) may be implemented with a system on chip (SoC) including a central processing unit (CPU), a graphic processing unit (GPU), a memory, and the like.

The processor 150 may transmit content to an external electronic device or may receive content from the external electronic device through the communication module 110. According to an embodiment of the present disclosure, if a content transmission event or a content reception event occurs, the processor 150 may determine the size of the content to be transmitted to the external electronic device or the size of the content to be received from the external electronic device. The content transmission event and the content reception event may occur, for example, based on a user command or a specific condition (e.g., a time). For example, the electronic device 100 may upload content (e.g., a photo or a video) to a social network service (SNS) server based on the user command. As another example, the electronic device 100 may upload content stored in the electronic device 100 (e.g., the memory 120) to a backup server per specific period (e.g., a week). As another example, the electronic device 100 may load content included in a web page from a web server based on a user command.

According to an embodiment of the present disclosure, if a content reception event occurs, the processor 150 may request content from an external electronic device through the communication module 110. The processor 150 may receive information about the size of the content from the external electronic device through the communication module 110 based on the request for the content. For example, in a transmission control protocol (TCP)-based communication, the processor 150 may receive a response message (e.g., a 200 OK message) including information (e.g., content-length) about the size of the content in response to the request for the content from the external electronic device. The processor 150 may determine the size of the content to be received from the external electronic device by using information about the size of the content received from the external electronic device.

The processor 150 may differently set the content transmission speed or the content reception speed based on the size of the content. According to an embodiment of the present disclosure, if the size of the content is less than a specific size (or a first reference size), the processor 150 may transmit or receive the content at a first speed. If the size of the content is greater than or equal to the specific size, the processor 150 may transmit or receive the content at a second speed. The first speed may be, for example, a maximum speed or an average speed at which content is to be transmitted or to be received in a current network environment. The second speed may be, for example, a speed slower than the first speed.

The processor 150 may change a specific size (or the first reference size) based on a user setting. The processor 150 may change the specific size (or the first reference size) based on cellular data usage or the remaining amount of cellular data of the electronic device 100. For example, as the cellular data usage increases (e.g., as the remaining amount of cellular data decreases), the processor 150 may make the specific size smaller. As another example, the processor 150 may set the remaining amount of cellular data to the specific size. The cellular data usage may mean, for example, data usage transmitted or received over a mobile communication network provided by a specific communication company from a specific point in time according to a contract with the communication company. For example, in the case where a user is able to use data of the specific size (e.g., 2 gigabyte (GByte)) for a specific period of time (e.g., a month) based on the contract with the communication company, the remaining amount of cellular data may mean the remaining amount of cellular data, which is available for the remaining period of time, of the total amount of available cellular data other than the amount of cellular data previously used. The processor 150 may receive information about the cellular data usage or the remaining amount of cellular data from the mobile communication company server.

According to an embodiment of the present disclosure, if the processor 150 does not know the size of the content to be received from an external electronic device (e.g., if information about the size of the content is not received from the external electronic device), the processor 150 may receive the content at the first speed. If the content is received by the specific size (or a second reference size) (e.g., 1 megabyte (MB)) at the first speed, the processor 150 may receive the content at the second speed. For example, if the processor 150 does not know the size of content to be received from the external electronic device, the processor 150 may receive the content by the specific size at the first speed and may then change the content reception speed to the second speed.

The processor 150 may change a specific size (or the second reference size) based on a user setting. The processor 150 may change the specific size (or the second reference size) based on the cellular data usage of the electronic device 100. For example, as the cellular data usage increases (e.g., as the remaining amount of cellular data decreases), the processor 150 may make the specific size smaller. As another example, the processor 150 may set the remaining amount of the cellular data to the specific size.

According to an embodiment of the present disclosure, when receiving content from an external electronic device, the processor 150 may receive divided content, which is generated by dividing the content into a specific unit. For example, the specific unit may be a segment unit. The external electronic device that transmits content may set a size of the segment based on a current network environment or a current status (e.g., a size of a receiving buffer) of the electronic device 100. If the divided content is received from the external electronic device, the processor 150 may transmit a response message in response to receiving the divided content through the communication module 110.

According to an embodiment of the present disclosure, if a response message to the divided content transmitted to the electronic device 100 is received from the electronic device 100, an external electronic device may transmit the next divided content to the electronic device 100. For example, if the response message is received within a specific time after first divided content is transmitted to the electronic device 100, the external electronic device may transmit second divided content to the electronic device 100. If the response message to the divided content is not received within the specific time, the external electronic device may re-transmit the corresponding divided content.

The processor 150 may control the content reception speed by controlling a time (hereinafter "transmission time") when a response message to the reception of divided content is transmitted. The processor 150 may transmit the response message to the reception of the divided content to an external electronic device immediately after the divided content is received from the external electronic device. Accordingly, the processor 150 may receive content at the first speed. The processor 150 may transmit the response message to the reception of the divided content after the divided content is received from the external electronic device and a specific time (e.g., one second) elapses. Accordingly, the processor 150 may receive content at the second speed.

According to an embodiment of the present disclosure, if a transmission waiting time for a response message, which is set in the electronic device 100, is longer than a re-transmission waiting time for divided content, which is set in an external electronic device, the processor 150 may receive the divided content again from the external electronic device before transmitting the response message to the divided content (e.g., before a specific time elapses after the divided content is received). If the divided content is received again from the external electronic device before the response message is transmitted, the processor 150 may set a specific time (e.g., a transmission waiting time for the response message) to be shorter than the re-reception time (e.g., a time taken to receive the divided content again) of the divided content. Accordingly, the electronic device 100 may reduce the content reception speed while preventing the occurrence of unnecessary network costs.

According to an embodiment of the present disclosure, when transmitting content to an external electronic device, the processor 150 may divide the content to be transmitted into a specific unit and may transmit the divided content to the external electronic device. For example, the specific unit may be a segment unit. The processor 150 may set a size of the segment based on a current network environment, a current status (e.g., a size of a receiving buffer) of the external electronic device, and the like.

The processor 150 may control the content transmission speed by controlling a transmission time of divided content. The processor 150 may transmit the next divided content (e.g., a second divided content) to an external electronic device immediately after a response message to the divided content (e.g., first divided content) is received from the external electronic device. Accordingly, the processor 150 may transmit content at the first speed. The processor 150 may transmit the next divided content (e.g., the second divided content) to the external electronic device after the response message to the divided content (e.g., the first divided content) is received from the external electronic device and a specific time (e.g., one second) elapses. Accordingly, the processor 150 may transmit content at the second speed.

According to an embodiment of the present disclosure, based on the size of content, the processor 150 may transmit or receive the content or may not transmit or receive the content. If the size of the content is less than a specific size (or the first reference size), the processor 150 may transmit or receive the content at the first speed. If the size of the content is greater than or equal to the specific size, the processor 150 may not transmit or receive the content. For example, if the size of the content is greater than or equal to the specific size, the processor 150 may not request the corresponding content from an external electronic device.

According to an embodiment of the present disclosure, if the processor 150 does not know the size of the content to be received from an external electronic device (e.g., if information about the size of the content is not received from the external electronic device), the processor 150 may receive the content at the first speed. If content of the specific size (or the second reference size) (e.g., 1 megabyte (MB)) is received at the first speed, the processor 150 may not receive the content. For example, if the processor 150 does not know the size of the content to be received from the external electronic device, the processor 150 may not transmit a response message to the reception of the content (e.g., divided content) after receiving the content of the specific size at the first speed.

FIGS. 2A to 2D are drawings illustrating a user interface according to various embodiments of the present disclosure.

According to an embodiment of the present disclosure, if the content transmission speed or the content reception speed decreases (e.g., if content is transmitted or received at the second speed), the processor 150 may display a user interface including information associated with the content, of which the transmission or reception speed is reduced, on the display 140. For example, the information associated with the content may include at least one of a transmission or reception rate of the content, the size of the content, the transmission or reception amount of the content, a transmission or reception speed of the content, or a user selection menu for the transmission and reception of the content. In response to a user command received through the user interface, the processor 150 may cancel the transmission or reception of content or may transmit or receive content at a first speed. In this regard, an example in which content included in a web page is received from a web server will be described with reference to FIGS. 2A to 2D.

Figure 2A:
FIGS. 2A to 2D are drawings illustrating a user interface according to various embodiments of the present disclosure.

Referring to FIG. 2A, a user interface provided from a web browser application may be displayed on the display 140. If a user selects a specific web page (e.g., NEWS), the processor 150 may load the web page selected by the user and may display the selected web page on the display 140. For example, if the specific web page is selected by the user, the processor 150 may request content (e.g., sub-resources such as an image, a text, and the like) included in the web page from the web server and may display the content received from the web server on the display 140 based on a specific layout.

Figure 2B:
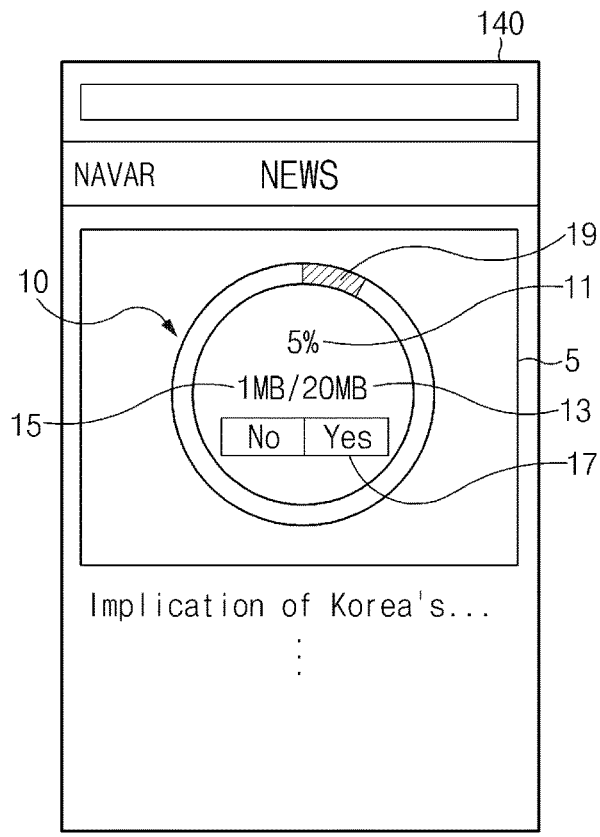

Referring to FIG. 2B, if content of which a reception speed is reduced is included in the selected web page, the processor 150 may display information 10 associated with the content, of which the reception speed is reduced, on the display 140. For example, the processor 150 may display information associated with the content at a location 5, on which the content is to be displayed. The information associated with the content may include a reception rate 11 of the content, a size 13 of the content, a current reception amount 15 of the content, a user selection menu 17 for the reception of the content, and a bar gauge 19 indicating the amount of content currently received. The user may input a content reception command or a content reception cancel command by using the selection menu 17.

Figure 2C:
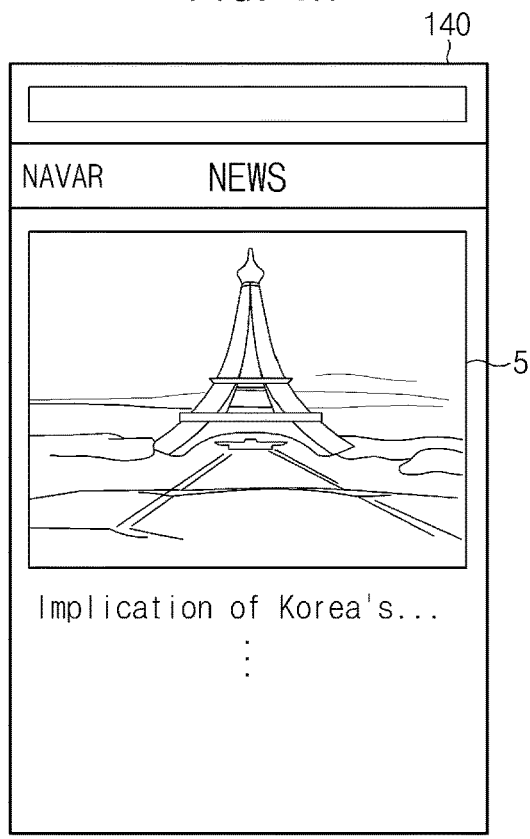

According to an embodiment of the present disclosure, if a content reception menu (e.g., YES) is selected by the user, the processor 150 may receive content at the first speed. For example, the processor 150 may restore the content reception speed from the second speed to the first speed. Referring to FIG. 2C, if the content is completely received, the processor 150 may display, for example, the received content on the display 140.

Figure 2D:
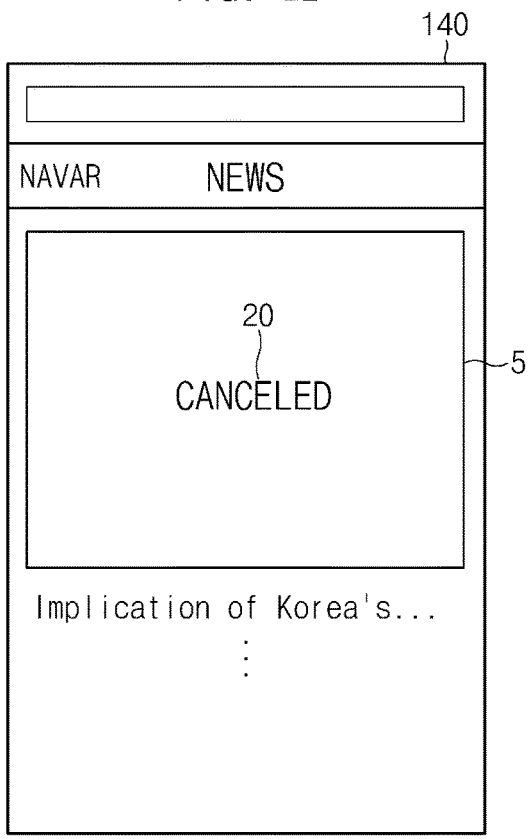

According to an embodiment of the present disclosure, if a content reception cancel menu (e.g., NO) is selected by the user, the processor 150 may cancel the reception of the content. For example, the processor 150 may send a message for canceling the reception of the content to the web server through the communication module 110. Referring to FIG. 2D, if the reception of the content is canceled, the processor 150 may display, for example, an object 20 indicating that the reception of the content is canceled, at the location 5 on which the content is to be displayed.

According to an embodiment of the present disclosure, a function for controlling the content transmission or reception speed described with reference to FIGS. 1 and 2 may be performed based on a user setting. For example, the user may set whether to use the function for controlling the content transmission or reception speed through the input module 110.

The function for controlling the content transmission or reception speed described with reference to FIGS. 1 and 2 may be performed based on cellular data usage or the remaining amount of cellular data. For example, if cellular data usage of the electronic device 100 is greater than or equal to a specific value (e.g., 80% of the total amount of cellular data available), the processor 150 may control the content transmission or reception speed. As another example, if the remaining amount of cellular data is less than a specific value (e.g., 20% of the total amount of cellular data available or 200 MB (megabyte)), the processor 150 may control the content transmission or reception speed. For example, if the cellular data usage is less than a specific value or the remaining amount of cellular data is greater than or equal to the specific value, the processor 150 may transmit or receive content at the first speed regardless of the size of the content.

The function for controlling the content transmission or reception speed described with reference to FIGS. 1 and 2 may be performed based on the type of network, which the electronic device 100 (e.g., the communication module 110) uses. For example, if the electronic device 100 is connected to a network (e.g., a free Wi-Fi, a Bluetooth, and the like) currently available for free, the processor 150 may make it impossible to perform the function for controlling the content transmission or reception speed. As another example, if the electronic device 100 is connected to a network (e.g., a cellular network) currently available for a fee, the processor 150 may make it possible to perform the function for controlling the content transmission or reception speed.

According to various embodiments of the present disclosure, an electronic device may include a communication module configured to communicate with an external electronic device and a processor configured to determine the size of the content, to transmit or receive the content at a first speed if the size of the content is less than a specific size, and to transmit or receive the content at a second speed, which is slower than the first speed, if the size of the content is greater than or equal to the specific size.

According to various embodiments of the present disclosure, the processor may be configured to request the content from the external electronic device, to receive information about the size of the content requested, from the external electronic device, and to determine the size of the content by using the information about the size of the content.

According to various embodiments of the present disclosure, the processor may be configured to receive the content at the first speed if the information about the size of the content is not received from the external electronic device and to receive the content at the second speed if the content is received by the specific size.

According to various embodiments of the present disclosure, the processor may be configured to receive divided content, which is generated by dividing the content into a specific unit, from the external electronic device and to transmit a response message to the reception of the divided content after the divided content is received and a specific time elapses.

According to various embodiments of the present disclosure, the processor may be configured to set the specific time to be shorter than a re-reception time of the divided content if the divided content is received again from the external electronic device before the response message is transmitted.

According to various embodiments of the present disclosure, the processor may be configured to divide the content into a specific unit, to transmit first divided content to the external electronic device, to receive a response message to reception of the first divided content from the external electronic device, and to transmit second divided content if a specific time elapses after the response message is received.

According to various embodiments of the present disclosure, the electronic device may further comprise a display and the processor is configured to display a user interface including information about content, which is transmitted or received at the second speed, on the display.

According to various embodiments of the present disclosure, the information about the content may comprise at least one of a transmission or reception rate of the content, the size of the content, a transmission or reception amount of the content, a transmission or reception speed of the content, and a user selection menu for transmission or reception of the content.

According to various embodiments of the present disclosure, the processor may be configured to cancel the transmission or reception of the content or, to transmit or receive the content at the first speed, based on a user command input through the user interface.

According to various embodiments of the present disclosure, the processor may be configured to verify cellular data usage of the electronic device and to transmit or receive the content at the second speed if the verification result indicates that the usage is greater than or equal to a specific value.

According to various embodiments of the present disclosure, an electronic device may include a communication circuit, a display, a processor electrically connected with the communication circuit and the display and a memory electrically connected with the processor. The memory stores instructions which, when executed, cause the processor to verify a size of at least one content to be received from an external electronic device or to be transmitted to the external electronic device by using the communication circuit, compare the size of the at least one content with a specific size, perform a first action associated with the transmission or the reception if the size of the at least one content is greater than or equal to the specific size and perform a second action associated with the transmission or the reception if the size of the at least one content is less than the specific size.

According to various embodiments of the present disclosure, the instructions may cause the processor to monitor a data usage allocated to the electronic device or a remaining amount of data usage, and compare the size of the at least one content with the monitored usage or the monitored remaining amount of data as the specific size.

According to various embodiments of the present disclosure, the first action may comprise transmitting or receiving the at least one content at a first speed, and the second action may comprise transmitting or receiving the at least one content at a second speed, which is slower than the first speed.

According to various embodiments of the present disclosure, the first action may comprise transmitting or receiving the at least one content, and the second action may comprise not transmitting or receiving the at least one content.

According to various embodiments of the present disclosure, the instructions may cause the processor to display, on at least part of the display, a user interface associated with the transmission or reception, perform the first action or the second action response to a user input to the user interface.

According to various embodiments of the present disclosure, the user interface may comprise at least one image or text indicating the size of the content.

According to various embodiments of the present disclosure, the user interface may be composed to select whether to execute the first action or the second action.

Figure 3:
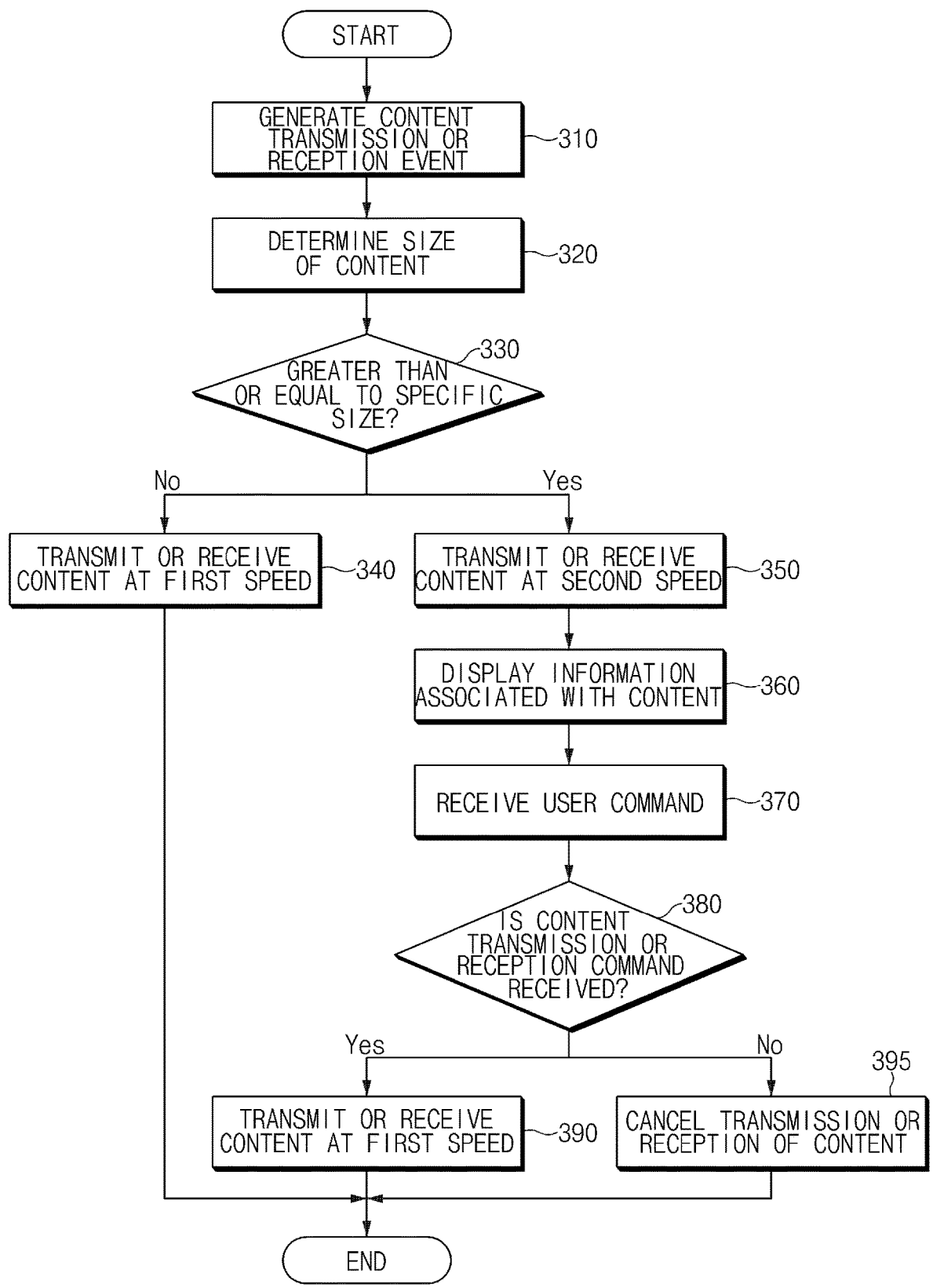
FIG. 3 is a flowchart illustrating a content transmitting and receiving method of an electronic device according to various embodiments of the present disclosure.

FIG. 3 is a flowchart illustrating a content transmitting and receiving method of an electronic device according to various embodiments of the present disclosure.

FIG. 3 is a flowchart describing an example in which the electronic device 100 controls the content transmission or reception speed when knowing the size of the content. The flowchart illustrated in FIG. 3 may include operations that the electronic device 100 illustrated in FIG. 1 processes. A description of the electronic device 100 given with reference to FIGS. 1 to 2 may be applied to the flowchart shown in FIG. 3.

Referring to FIG. 3, according to various embodiments of the present disclosure, in step 310, a content transmission event or a content reception event occurs at the electronic device 100. The content transmission event and the content reception event may occur, for example, based on a user command or a specific condition (e.g., a time).

According to an embodiment of the present disclosure, in step 320, the electronic device 100 determines the size of the content to be transmitted to an external electronic device or the size of the content to be received from the external electronic device. If the content reception event occurs, the electronic device 100 may request the content from the external electronic device and may receive information about the size of the content from the external electronic device. The electronic device 100 may determine the size of the content to be received from the external electronic device by using information of the size of the content received from the external electronic device.

According to an embodiment of the present disclosure, in step 330, the electronic device 100 determines whether the size of the content to be transmitted to the external electronic device or the size of the content to be received from the external electronic device is greater than or equal to a specific size (or a first reference size). The electronic device 100 may change the specific size based on a user setting. The electronic device 100 may change the specific size based on cellular data usage of the electronic device 100.

According to an embodiment of the present disclosure, if it is determined that the size of content is less than the specific size (or a reference size), in step 340, the electronic device 100 transmits or receives the content at a first speed. The first speed may be, for example, a maximum speed at which content is transmitted or received in a current network environment. For example, the electronic device 100 may transmit a response message to the reception of divided content to the external electronic device immediately after the divided content is received from the external electronic device. As another example, the electronic device 100 may transmit the next divided content (e.g., second divided content) to the external electronic device immediately after a response message to the divided content (e.g., first divided content) is received from the external electronic device.

According to an embodiment of the present disclosure, if it is determined that the size of the content is greater than or equal to the specific size, in step 350, the electronic device 100 transmits or receives the content at the second speed. The second speed may be, for example, slower than the first speed. For example, the electronic device 100 may transmit the response message to the reception of the divided content after the divided content is received from the external electronic device and a specific time (e.g., one second) elapses. As another example, the electronic device 100 may transmit the next divided content (e.g., the second divided content) after the response message to the divided content (e.g., the first divided content) is received from the external electronic device and the specific time (e.g., one second) elapses.

According to an embodiment of the present disclosure, if the divided content is received again from the external electronic device before the response message is transmitted, the electronic device 100 may set the specific time (e.g., a transmission waiting time for the response message) to be shorter than the re-reception time (e.g., a time taken to receive the divided content again) of the divided content.

According to an embodiment of the present disclosure, if the content transmission speed or the content reception speed decreases (e.g., if content is transmitted or received at the second speed), in step 360, the electronic device 100 displays a user interface including information associated with the content, of which the transmission or reception speed is reduced, on a display. For example, the information associated with the content may include at least one of a transmission or reception rate of the content, the size of the content, a transmission or reception amount of the content, a transmission or reception speed of the content, or a user selection menu for the transmission and reception of the content.

According to an embodiment of the present disclosure, in step 370, the electronic device 100 receives a user command through the user interface (e.g., the user selection menu). For example, the electronic device 100 may receive a content transmission menu or a content reception menu selected by a user. As another example, the electronic device 100 may receive a content transmission cancel menu or a content reception cancel menu selected by the user.

In step 380, the electronic device 100 determines whether a content transmission command or a content reception command is received.

If the content transmission or reception command is received, in step 390, the electronic device 100 transmits or receives the content at the first speed.

According to an embodiment of the present disclosure, if the content transmission or reception command is not received, in step 395, the electronic device 100 cancels the transmission or reception of the content. For example, if the content transmission cancel menu or the content reception cancel menu is received, the electronic device 100 may cancel the transmission or reception of the content. As another example, if the content transmission or reception command is not received in a specific time (e.g., 10 seconds), the electronic device 100 may cancel the transmission or reception of the content.

The function for controlling the content transmission or reception speed described with reference to FIG. 3 may be performed based on the user setting. The function for controlling the content transmission or reception speed may be performed based on the type of network, which the electronic device 100 (e.g., the communication module 110) uses.

Figure 4:
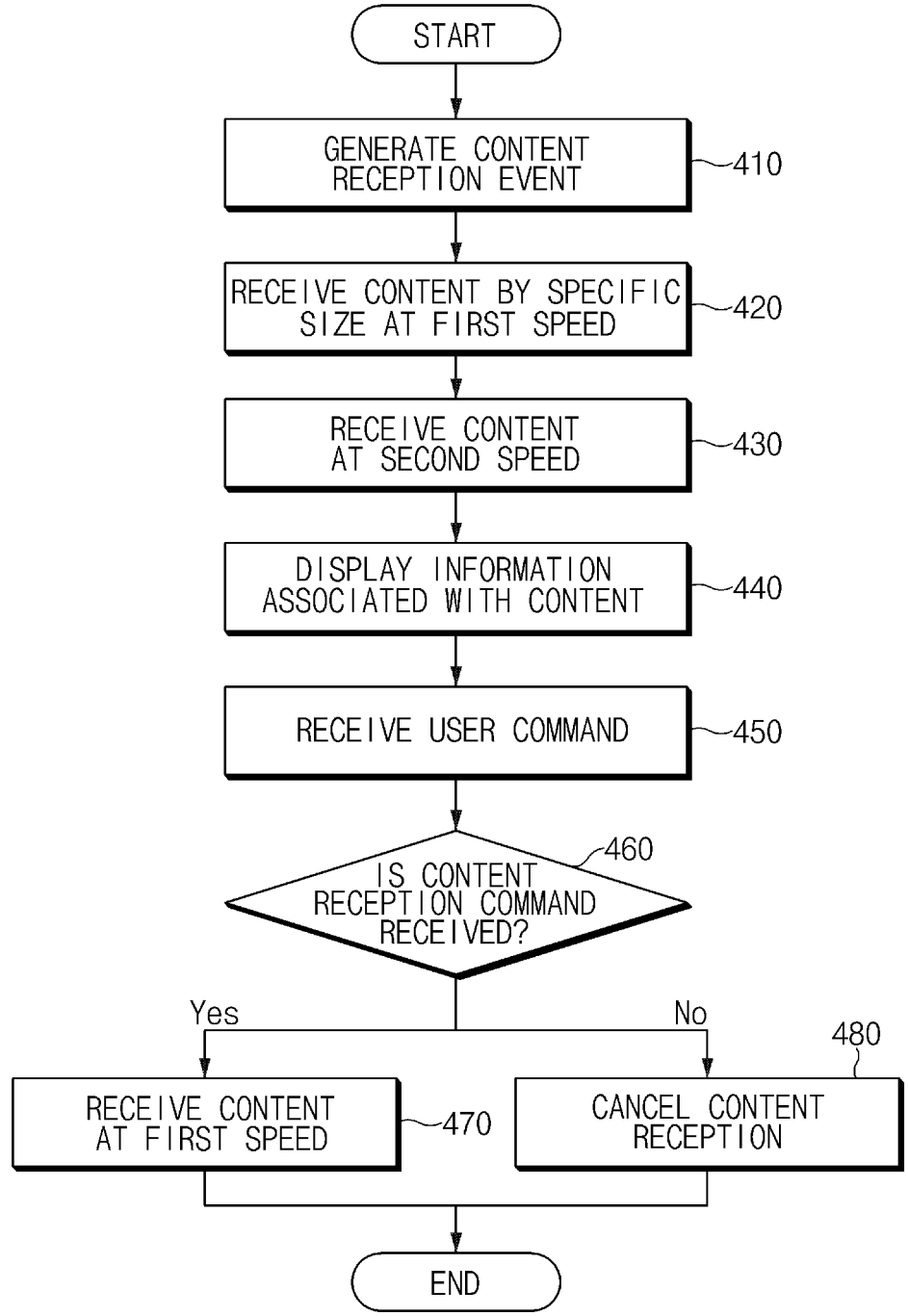
FIG. 4 is a flowchart illustrating another content transmitting and receiving method of an electronic device according to various embodiments of the present disclosure.

FIG. 4 is a flowchart illustrating a content transmitting and receiving method of an electronic device according to various embodiments of the present disclosure.

FIG. 4 describes an example in which the electronic device 100 controls a content reception speed when not knowing the size of the content. Since the electronic device 100 knows the size of the content when transmitting the content, the case in which the electronic device 100 receives content from an external electronic device is described as an example. The flowchart illustrated in FIG. 4 may include operations that the electronic device 100 illustrated in FIG. 1 processes. Thus, even though omitted below, a description of the electronic device 100 given with reference to FIGS. 1 and 2 may be applied to the flowchart shown in FIG. 4.

Referring to FIG. 4, in step 410, a content reception event occurs at the electronic device 100. For example, the content reception event may be generated based on a user command or a specific condition (e.g., a time).

According to an embodiment of the present disclosure, if the electronic device 100 does not know the size of the content to be received from the external electronic device (e.g., if the electronic device 100 does not receive information about the size of the content from the external electronic device), in step 420, the electronic device 100 receives the content at a first speed. For example, if the electronic device 100 does not know the size of the content to be received from the external electronic device, the electronic device 100 may receive the content by the specific size (or a second reference size) (e.g., 1 MB) at the first speed.

According to an embodiment of the present disclosure, if the content is received by the specific size (or the second reference size) (e.g., 1 MB) at the first speed, in step 430, the electronic device 100 receives the content at a second speed. For example, if the electronic device 100 does not know the size of the content to be received from the external electronic device, the electronic device 100 may change the content reception speed to the second speed after receiving the content by the specific size at the first speed. The electronic device 100 may change the specific size based on a user setting. The electronic device 100 may change the specific size based on cellular data usage of the electronic device 100.

According to an embodiment of the present disclosure, if the content reception speed decreases (e.g., the content is transmitted or received at the second speed), in step 440, the electronic device 100 displays a user interface including information associated with the content, of which the reception speed is reduced, on a display. For example, the information associated with the content may include at least one of a reception rate of the content, the size of the content, a reception amount of the content, a reception speed of the content, or a user selection menu for the reception of the content.

According to an embodiment of the present disclosure, in step 450, the electronic device 100 receives a user command through the user interface (e.g., the user selection menu). For example, the electronic device 100 may receive a content reception menu selected by a user. As another example, the electronic device 100 may receive a content reception cancel menu selected by the user.

In step 460, the electronic device 100 determines whether a content reception command is received. If the content reception command is received, in step 470, the electronic device 100 receives the content at the first speed. If the content reception command is not received (or a content reception cancel command is received), in step 480, the electronic device 100 cancels the reception of the content.

According to an embodiment of the present disclosure, a function for controlling the content reception speed described with reference to FIG. 3 or FIG. 4 may be performed based on cellular data usage set by a user or the type of network, which the electronic device 100 (e.g., the communication module 110) uses.

According to various embodiments of the present disclosure, a content transmitting and receiving method of an electronic device may include determining the size of the content, transmitting or receiving the content at a first speed if the size of the content is less than a specific size and transmitting or receiving the content at a second speed, which is slower than the first speed, if the size of the content is greater than or equal to the specific size.

According to various embodiments of the present disclosure, determining the size of the content may comprise requesting the content from the external electronic device, receiving information about the size of the content requested, from the external electronic device and determining the size of the content to be received by using the information about the size of the content.

According to various embodiments of the present disclosure, the method may further comprise receiving the content by a specific size at the first speed if the information about the size of the content is not received from the external electronic device and receiving the content at the second speed if the content is received by the specific size.

According to various embodiments of the present disclosure, receiving the content at the second speed may comprise receiving divided content, which is generated by dividing the content into a specific unit, from the external electronic device and transmitting a response message to the reception of the divided content after the divided content is received and a specific time elapses.

According to various embodiments of the present disclosure, receiving the content at the second speed may further comprise setting the specific time to be shorter than a re-reception time of the divided content if the divided content is received again from the external electronic device before the response message is transmitted.

According to various embodiments of the present disclosure, transmitting the content at the second speed may comprise dividing the content into a specific unit, transmitting first divided content to the external electronic device, receiving a response message to reception of the first divided content from the external electronic device and transmitting second divided content if a specific time elapses after the response message is received.

According to various embodiments of the present disclosure, the method may further comprise displaying a user interface including information about content, which is transmitted or received at the second speed, on a display.

According to various embodiments of the present disclosure, the information about the content may comprise at least one of a transmission or reception rate of the content, the size of the content, a transmission or reception amount of the content, a transmission or reception speed of the content, and a user selection menu for transmission or reception of the content.

According to various embodiments of the present disclosure, the method may further comprise canceling the transmitting or receiving of the content or, transmitting or receiving the content at the first speed, based on a user command input through the user interface.

According to various embodiments of the present disclosure, transmitting or receiving the content at a second speed may comprise verifying cellular data usage of the electronic device and transmitting or receiving the content at the second speed if the verification result indicates that the usage is greater than or equal to a specific value.

Figure 5:
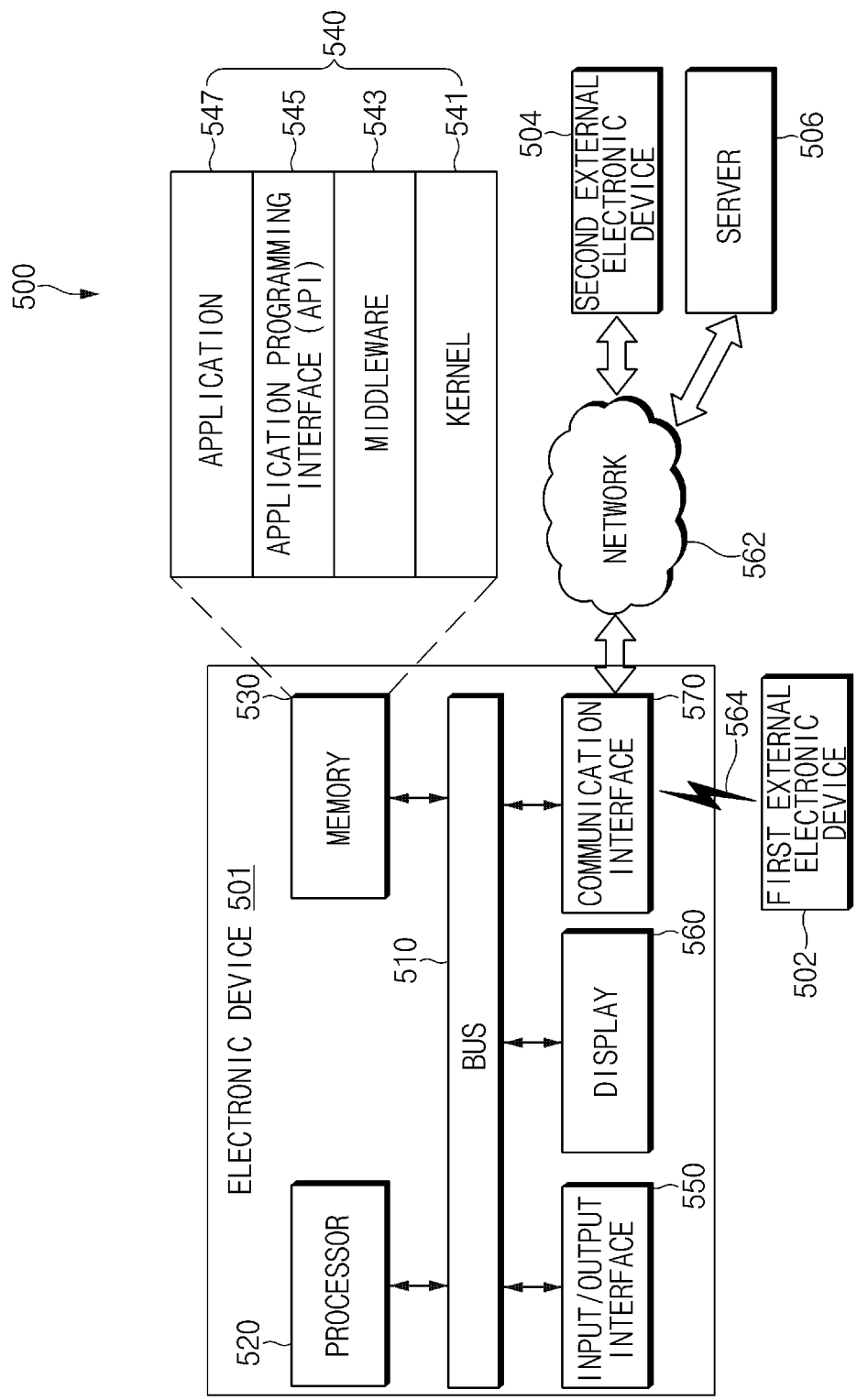
FIG. 5 is a drawing illustrating an electronic device in a network environment according to various embodiments of the present disclosure.

FIG. 5 illustrates an electronic device in a network environment according to an embodiment of the present disclosure.

An electronic device 501 in a network environment 500 will be described with reference to FIG. 5. The electronic device 501 includes a bus 510, a processor 520, a memory 530, an input/output interface 550, a display 560, and a communication interface 570. At least one of the foregoing elements may be omitted or another element may be added to the electronic device 501.

The bus 510 may include a circuit for connecting the above-mentioned elements 510 to 570 to each other and transferring communications (e.g., control messages and/or data) among the above-mentioned elements.

The processor 520 may include at least one of a central processing unit (CPU), an application processor (AP), or a communication processor (CP). The processor 520 may perform data processing or an operation related to communication and/or control of at least one of the other elements of the electronic device 501.

The memory 530 may include a volatile memory and/or a nonvolatile memory. The memory 530 may store instructions or data related to at least one of the other elements of the electronic device 501. According to an embodiment of the present disclosure, the memory 530 may store software and/or a program 540. The program 540 includes, for example, a kernel 541, a middleware 543, an application programming interface (API) 545, and/or an application program (or an application) 547. At least a portion of the kernel 541, the middleware 543, or the API 545 may be referred to as an operating system (OS).

The kernel 541 may control or manage system resources (e.g., the bus 510, the processor 520, the memory 530, and the like) used to perform operations or functions of other programs (e.g., the middleware 543, the API 545, or the application program 547). Furthermore, the kernel 541 may provide an interface for allowing the middleware 543, the API 545, or the application program 547 to access individual elements of the electronic device 501 in order to control or manage the system resources.

The middleware 543 may serve as an intermediary so that the API 545 or the application program 547 communicates and exchanges data with the kernel 541.

Furthermore, the middleware 543 may handle one or more task requests received from the application program 547 according to a priority order. For example, the middleware 543 may assign at least one application program 547 a priority for using the system resources (e.g., the bus 510, the processor 520, the memory 530, and the like) of the electronic device 501. For example, the middleware 543 may handle the one or more task requests according to the priority assigned to the at least one application, thereby performing scheduling or load balancing with respect to the one or more task requests.

The API 545, which is an interface for allowing the application 547 to control a function provided by the kernel 541 or the middleware 543, may include, for example, at least one interface or function (e.g., instructions) for file control, window control, image processing, character control, and the like.

The input/output interface 550 may serve to transfer an instruction or data input from a user or another external device to other elements of the electronic device 501. Furthermore, the input/output interface 550 may output instructions or data received from other elements of the electronic device 501 to the user or another external device.

The display 560 may include, for example, a liquid crystal display (LCD), a light-emitting diode (LED) display, an organic light-emitting diode (OLED) display, a microelectromechanical systems (MEMS) display, or an electronic paper display. The display 560 may present various content (e.g., a text, an image, a video, an icon, a symbol, and the like) to the user. The display 560 may include a touch screen, and may receive a touch, gesture, proximity or hovering input from an electronic pen or a part of a body of the user.

The communication interface 570 may set communications between the electronic device 501 and a first external electronic device 502, a second external electronic device 504, or a server 506. For example, the communication interface 570 may be connected to a network 562 via wireless communications or wired communications so as to communicate with the second external electronic device 504 or the server 506.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 564. The short-range communications may include at least one of wireless fidelity (Wi-Fi), Bluetooth, Bluetooth low energy (BLE), Zigbee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), and the like. The network 562 may include at least one of telecommunications networks, for example, a computer network (e.g., local area network (LAN) or wide area network (WAN)), the Internet, or a telephone network.

The types of the first external electronic device 502 and the second external electronic device 504 may be the same as or different from the type of the electronic device 501. According to an embodiment of the present disclosure, the server 506 may include a group of one or more servers. A portion or all of operations performed in the electronic device 501 may be performed in the first electronic device 502, the second external electronic device 504, or the server 506. When the electronic device 501 performs a certain function or service automatically or in response to a request, the electronic device 501 may request at least a portion of functions related to the function or service from the first electronic device 502, the second external electronic device 504, or the server 506, instead of or in addition to performing the function or service for itself. The first electronic device 502, the second external electronic device 504, or the server 506 may perform the requested function or additional function, and may transfer a result of the performance to the electronic device 501. The electronic device 501 may use a received result itself or additionally process the received result to provide the requested function or service. To this end, for example, a cloud computing technology, a distributed computing technology, or a client-server computing technology may be used.

Figure 6:
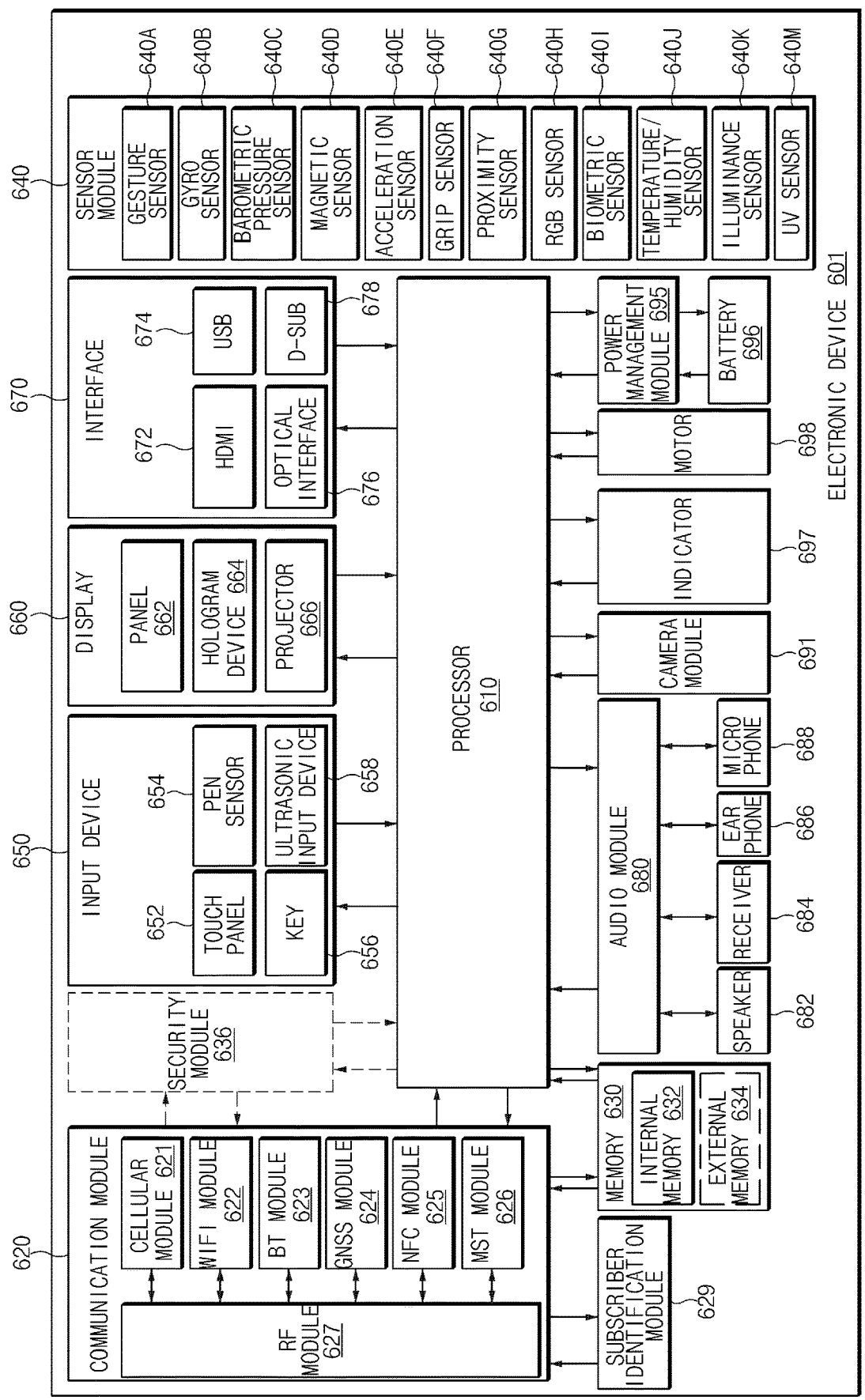
FIG. 6 a block diagram illustrating an electronic device according to various embodiments.

FIG. 6 is a block diagram illustrating an electronic device according to an embodiment of the present disclosure.

Referring to FIG. 6, an electronic device 601 may include, for example, a part or the entire electronic device 501 illustrated in FIG. 5. The electronic device 601 includes at least one processor (e.g., AP) 610, a communication module 620, a subscriber identification module (SIM) 629, a memory 630, a sensor module 640, an input device 650, a display 660, an interface 670, an audio module 680, a camera module 691, a power management module 695, a battery 696, an indicator 697, and a motor 698.

The processor 610 may run an operating system or an application program to control a plurality of hardware or software elements connected to the processor 610, and may process various data and perform operations. The processor 610 may be implemented with, for example, a system on chip (SoC). According to an embodiment of the present disclosure, the processor 610 may further include a graphic processing unit (GPU) and/or an image signal processor. The processor 610 may include at least a portion (e.g., a cellular module 621) of the elements illustrated in FIG. 6. The processor 610 may load, on a volatile memory, an instruction or data received from at least one of other elements (e.g., a nonvolatile memory) to process the instruction or data, and may store various data in a nonvolatile memory.

The communication module 620 may have a configuration that is the same as, or similar to, that of the communication interface 570 of FIG. 5. The communication module 620 may include, for example, the cellular module 621, a Wi-Fi module 622, a Bluetooth module 623, a GNSS module 624 (e.g., a GPS module, a GLONASS module, a BeiDou module, or a Galileo module), an NFC module 625, an MST module 626 and a radio frequency (RF) module 627.

The cellular module 621 may provide, for example, a voice call service, a video call service, a text message service, or an Internet service through a communication network. The cellular module 621 may identify and authenticate the electronic device 601 in the communication network using the subscriber identification module 629 (e.g., a SIM card). The cellular module 621 may perform at least a part of functions that may be provided by the processor 610. The cellular module 621 may include a communication processor (CP).

Each of the Wi-Fi module 622, the Bluetooth module 623, the GNSS module 624, the NFC module 625 and the MST module 626 may include, for example, a processor for processing data transmitted/received through the modules. According to various embodiments of the present disclosure, at least a part (e.g., two or more) of the cellular module 621, the Wi-Fi module 622, the Bluetooth module 623, the GNSS module 624, the NFC module 625 and the MST module 626 may be included in a single integrated chip (IC) or IC package.

The RF module 627 may transmit/receive, for example, communication signals (e.g., RF signals). The RF module 627 may include, for example, a transceiver, a power amp module (PAM), a frequency filter, a low noise amplifier (LNA), an antenna, and the like. According to another embodiment of the present disclosure, at least one of the cellular module 621, the Wi-Fi module 622, the Bluetooth module 623, the GNSS module 624, the NFC module 625 and the MST module 626 may transmit/receive RF signals through a separate RF module.

The SIM 629 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 630 (e.g., the memory 530) includes, for example, an internal memory 632 or an external memory 634. The internal memory 632 may include at least one of a volatile memory (e.g., a dynamic RAM (DRAM), a static RAM (SRAM), a synchronous dynamic RAM (SDRAM), and the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, and the like)), a hard drive, or a solid state drive (SSD).

The external memory 634 may include a flash drive such as a compact flash (CF), a secure digital (SD), a micro-SD, a mini-SD, an extreme digital (xD), a multimediacard (MMC), a memory stick, and the like. The external memory 634 may be operatively and/or physically connected to the electronic device 601 through various interfaces.

A security module 636, which is a module including a storage space with a higher security level than the memory 630, may be a circuit for securing safe data storage and protected execution circumstances. The security module 636 may be implemented with an additional circuit and may include an additional processor. The security module 636 may be present in an attachable smart chip or SD card, or may include an embedded secure element (eSE), which is installed in a fixed chip. Additionally, the security module 636 may be driven in another OS which is different from the OS of the electronic device 601. For example, the security module 636 may operate based on a Java card open platform (JCOP) OS.

The sensor module 640 may, for example, measure physical quantity or detect an operation state of the electronic device 601 so as to convert measured or detected information into an electrical signal. The sensor module 640 includes, for example, at least one of a gesture sensor 640A, a gyro sensor 640B, a barometric pressure sensor 640C, a magnetic sensor 640D, an acceleration sensor 640E, a grip sensor 640F, a proximity sensor 640G, a color sensor 640H (e.g., a red/green/blue (RGB) sensor), a biometric sensor 640I, a temperature/humidity sensor 640J, an illumination sensor 640K, or an ultraviolet (UV) sensor 640M. Additionally or alternatively, the sensor module 640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 640 may further include a control circuit for controlling at least one sensor included therein. In various embodiments of the present disclosure, the electronic device 601 may further include a processor configured to control the sensor module 640 as a part of the processor 610 or separately, so that the sensor module 640 is controlled while the processor 610 is in a sleep state.

The input device 650 includes, for example, a touch panel 652, a (digital) pen sensor 654, a key 656, or an ultrasonic input device 658. The touch panel 652 may employ at least one of capacitive, resistive, infrared, and ultraviolet sensing methods. The touch panel 652 may further include a control circuit. The touch panel 652 may further include a tactile layer so as to provide a haptic feedback to a user.

The (digital) pen sensor 654 may include, for example, a sheet for recognition which is a part of a touch panel or is separate. The key 656 may include, for example, a physical button, an optical button, or a keypad. The ultrasonic input device 658 may sense ultrasonic waves generated by an input tool through a microphone 688 so as to identify data corresponding to the ultrasonic waves sensed.

The display 660 (e.g., the display 560) includes a panel 662, a hologram device 664, or a projector 666. The panel 662 may have a configuration that is the same as or similar to that of the display 560 of FIG. 5. The panel 662 may be, for example, flexible, transparent, or wearable. The panel 662 and the touch panel 652 may be integrated into a single module. The hologram device 664 may display a stereoscopic image in a space using a light interference phenomenon. The projector 666 may project light onto a screen so as to display an image. The screen may be disposed in the inside or the outside of the electronic device 601. According to an embodiment of the present disclosure, the display 660 may further include a control circuit for controlling the panel 662, the hologram device 664, or the projector 666.

The interface 670 may include, for example, an HDMI 672, a USB 674, an optical interface 676, or a D-subminiature (D-sub) 678. The interface 670, for example, may be included in the communication interface 570 illustrated in FIG. 5. Additionally or alternatively, the interface 670 may include, for example, a mobile high-definition link (MHL) interface, an SD card/multi-media card (MMC) interface, or an infrared data association (IrDA) interface.

The audio module 680 may convert, for example, a sound into an electrical signal or vice versa. At least a portion of elements of the audio module 680 may be included in the input/output interface 550 illustrated in FIG. 5. The audio module 680 may process sound information input or output through a speaker 682, a receiver 684, an earphone 686, or the microphone 688.

The camera module 691 is, for example, a device for shooting a still image or a video. According to an embodiment of the present disclosure, the camera module 691 may include at least one image sensor (e.g., a front sensor or a rear sensor), a lens, an image signal processor (ISP), or a flash (e.g., an LED or a xenon lamp).

The power management module 695 may manage power of the electronic device 601. According to an embodiment of the present disclosure, the power management module 695 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, and the like. An additional circuit for wireless charging, such as a coil loop, a resonant circuit, a rectifier, and the like, may be further included. The battery gauge may measure, for example, a remaining capacity of the battery 696 and a voltage, current or temperature thereof while the battery is charged. The battery 696 may include, for example, a rechargeable battery and/or a solar battery.

The indicator 697 may display a specific state of the electronic device 601 or a part thereof (e.g., the processor 610), such as a booting state, a message state, a charging state, and the like. The motor 698 may convert an electrical signal into a mechanical vibration, and may generate a vibration or haptic effect. A processing device (e.g., a GPU) for supporting a mobile TV may be included in the electronic device 601. The processing device for supporting a mobile TV may process media data according to the standards of digital multimedia broadcasting (DMB), digital video broadcasting (DVB), MediaFLO™, and the like.

Figure 7:
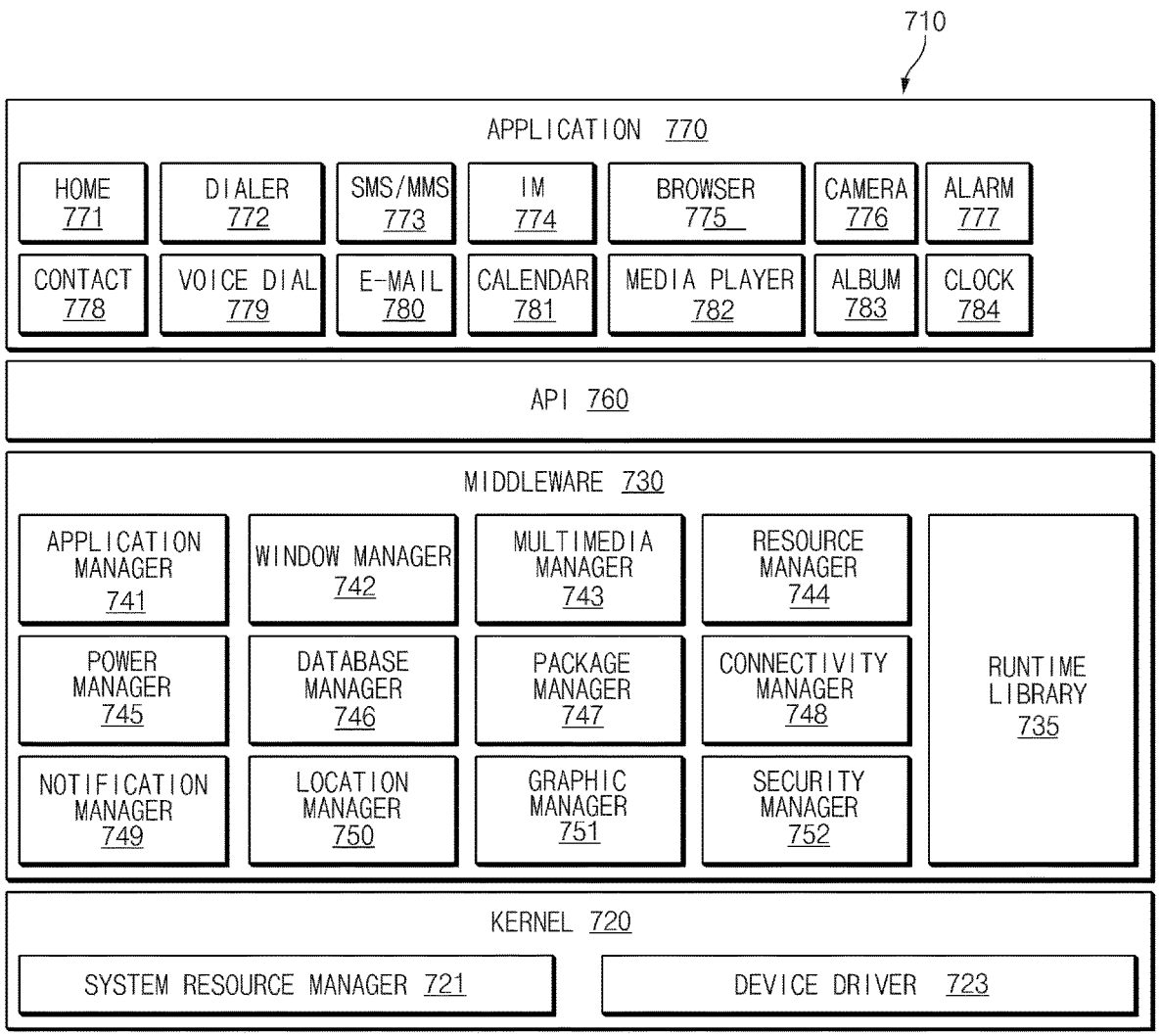
FIG. 7 illustrates a block diagram of a program module according to various embodiments.

FIG. 7 is a block diagram illustrating a program module according to an embodiment of the present disclosure.

Referring to FIG. 7, a program module 710 (e.g., the program 540) includes an operating system (OS) for controlling a resource related to an electronic device (e.g., the electronic device 501) and/or various applications (e.g., the application program 547) running on the OS. The operating system may be, for example, Android, iOS, Windows, Symbian, Tizen, and the like.

The program module 710 includes a kernel 720, a middleware 730, an API 760, and/or an application 770. At least a part of the program module 710 may be preloaded on an electronic device or may be downloaded from the first electronic device 502, the second external electronic device 504, or the server 506.

The kernel 720 (e.g., the kernel 541) includes, for example, a system resource manager 721 or a device driver 723. The system resource manager 721 may perform control, allocation, or retrieval of a system resource. According to an embodiment of the present disclosure, the system resource manager 721 may include a process management unit, a memory management unit, a file system management unit, and the like. The device driver 723 may include, for example, a display driver, a camera driver, a Bluetooth driver, a shared memory driver, a USB driver, a keypad driver, a Wi-Fi driver, an audio driver, or an inter-process communication (IPC) driver.

The middleware 730, for example, may provide a function that the applications 770 require in common, or may provide various functions to the applications 770 through the API 760 so that the applications 770 may efficiently use limited system resources in the electronic device. According to an embodiment of the present disclosure, the middleware 730 (e.g., the middleware 543) includes at least one of a runtime library 735, an application manager 741, a window manager 742, a multimedia manager 743, a resource manager 744, a power manager 745, a database manager 746, a package manager 747, a connectivity manager 748, a notification manager 749, a location manager 750, a graphic manager 751 and a security manager 752.

The runtime library 735 may include, for example, a library module that a complier uses to add a new function through a programming language while the application 770 is running. The runtime library 735 may perform a function for input/output management, memory management, or an arithmetic function.

The application manager 741 may mange, for example, a life cycle of at least one of the applications 770. The window manager 742 may manage a GUI resource used in a screen. The multimedia manager 743 may recognize a format required for playing various media files and may encode or de'code a media file using a codec matched to the format. The resource manager 744 may manage a resource such as a source code, a memory, or a storage space of at least one of the applications 770.

The power manager 745, for example, may operate together with a basic input/output system (BIOS) to manage a battery or power and may provide power information required for operating the electronic device. The database manager 746 may generate, search, or modify a database to be used in at least one of the applications 770. The package manager 747 may manage installation or update of an application distributed in a package file format.

The connectivity manger 748 may manage wireless connection of Wi-Fi, Bluetooth, and the like. The notification manager 749 may display or notify an event such as message arrival, appointments, and proximity alerts in such a manner as to not disturb a user. The location manager 750 may manage location information of the electronic device. The graphic manager 751 may manage a graphic effect to be provided to a user or a user interface related thereto. The security manager 752 may provide various security functions required for system security or user authentication. According to an embodiment of the present disclosure, in the case in which the electronic device 501 includes a phone function, the middleware 730 may further include a telephony manager for managing a voice or video call function of the electronic device.

The middleware 730 may include a middleware module for forming a combination of various functions of the above-mentioned elements. The middleware 730 may provide a module specialized for each type of an operating system to provide differentiated functions. Furthermore, the middleware 730 may delete a part of existing elements or may add new elements dynamically.

The API 760 (e.g., the API 545) which is, for example, a set of API programming functions may be provided in different configurations according to an operating system. For example, in the case of Android or iOS, one API set may be provided for each platform, and, in the case of Tizen, at least two API sets may be provided for each platform.

The application 770 (e.g., the application program 547), for example, includes at least one application capable of performing functions such as a home 771, a dialer 772, an SMS/MMS 773, an instant message (IM) 774, a browser 775, a camera 776, an alarm 777, a contact 778, a voice dial 779, an e-mail 780, a calendar 781, a media player 782, an album 783, a clock 784, health care (e.g., measure an exercise amount or blood sugar level), or environmental information provision (e.g., provide air pressure, humidity, or temperature information).

According to an embodiment of the present disclosure, the application 770 may include an information exchange application for supporting information exchange between the electronic device 501 and the first electronic device 502 or the second external electronic device 504. The information exchange application may include, for example, a notification relay application for relaying specific information to the external electronic device or a device management application for managing the external electronic device.

For example, the notification relay application may have a function for relaying, to the first electronic device 502 or the second external electronic device 504, notification information generated in another application (e.g., an SMS/MMS application, an e-mail application, a health care application, an environmental information application, and the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the first electronic device 502 or the second external electronic device 504 communicating with the electronic device, an application running in the external electronic device, or a service (e.g., a call service, a message service, and the like) provided from the external electronic device.

According to an embodiment of the present disclosure, the application 770 may include a specified application (e.g., a healthcare application of a mobile medical device) according to an attribute of the first electronic device 502 or the second external electronic device 504. The application 770 may include an application received from the first electronic device 502 or the second external electronic device 504. The application 770 may include a preloaded application or a third-party application downloadable from a server. The names of the elements of the program module 710 illustrated may vary with the type of an operating system.

According to various embodiments of the present disclosure, at least a part of the program module 710 may be implemented with software, firmware, hardware, or a combination thereof. At least a part of the program module 710, for example, may be implemented (e.g., executed) by a processor (e.g., the processor 210). At least a part of the program module 710 may include, for example, a module, a program, a routine, sets of instructions, or a process for performing at least one function.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" as used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable storage medium in the form of a program module. In the case where the instructions are performed by a processor 120, the processor may perform functions corresponding to the instructions. The computer-readable storage medium may be, for example, the memory 130.

A non-transitory computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, and the like). The program instructions may include machine language codes generated by compilers and high-level language codes that may be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, it may be possible to prevent unnecessary transmission or reception of content by controlling the content transmission speed or the content reception speed. Accordingly, the cellular data usage of the portable electronic device is reduced. This may make it possible for the user to reduce data charges.

While the present disclosure has been shown and described with reference to certain embodiments thereof, it will be understood by those skilled in the art that various changes in form and details may be made therein without departing from the spirit and scope of the present disclosure, as defined by the appended claims and their equivalents.

What is claimed is:

1. An electronic device comprising:
a communication module configured to communicate with an external electronic device; and
a processor configured to determine a size of content, transmit or receive the content at a first speed if the size of the content is less than a first specific size, and transmit or receive the content at a second speed, which is slower than the first speed, if the size of the content is greater than or equal to the first specific size,
wherein the processor is further configured to:
receive divided content, which is generated by dividing the content into a first specific unit, from the external electronic device, and
transmit a message in response to the reception of the divided content after the divided content is received and a first specific time elapses.

2. The electronic device of claim 1, wherein the processor is further configured to request the content from the external electronic device, receive information about a size of the content requested from the external electronic device, and determine the size of the content using the information about the size of the content.

3. The electronic device of claim 2, wherein the processor is further configured to receive the content at the first speed if the information about the size of the content is not received from the external electronic device and receive the content at the second speed after the content is received at the first speed by a second specific size.

4. The electronic device of claim 1, wherein the processor is further configured to set the specific time to be shorter than a re-reception time of the divided content if the divided content is received again from the external electronic device before the response message is transmitted.

5. The electronic device of claim 1, wherein the processor is further configured to divide the content into a second specific unit, transmit first divided content to the external electronic device, receive a response message to reception of the first divided content from the external electronic device, and transmit second divided content if a second specific time elapses after the response message is received.

6. The electronic device of claim 1, further comprising:
a display, wherein the processor is further configured to display a user interface including information about the content, which is transmitted or received at the second speed, on the display.

7. The electronic device of claim 6, wherein the information about the content comprises at least one of a transmission rate of the content, a reception rate of the content, the size of the content, a transmission amount of the content, a reception amount of the content, a transmission speed of the content, a reception speed of the content, a user selection menu for transmission of the content, and a user selection menu for reception of the content.

8. The electronic device of claim 6, wherein the processor is further configured to cancel the transmission or reception of the content or to transmit or receive the content at the first speed, based on a user command input through the user interface.

9. The electronic device of claim 1, wherein the processor is further configured to verify cellular data usage of the electronic device and to transmit or receive the content at the second speed if the verification result indicates that the usage is greater than or equal to a specific value.

10. A content transmitting and receiving method of an electronic device, the method comprising:
determining a size of content;
transmitting or receiving the content at a first speed if the size of the content is less than a first specific size; and
transmitting or receiving the content at a second speed, which is slower than the first speed, if the size of the content is greater than or equal to the first specific size,
wherein receiving the content at the second speed comprises:
receiving divided content, which is generated by dividing the content into a first specific unit, from the external electronic device; and transmitting a message in response to the reception of the divided content after the divided content is received and a first specific time elapses.

11. The method of claim 10, wherein determining the size of the content comprises:
   requesting the content from an external electronic device;
   receiving information about the size of the content requested, from the external electronic device; and
   determining the size of the content to be received using the information about the size of the content.

12. The method of claim 11, further comprising:
   receiving the content at the first speed if the information about the size of the content is not received from the external electronic device; and
   receiving the content at the second speed after the content is received at the first speed by a second specific size.

13. The method of claim 10, wherein receiving the content at the second speed further comprises:
   setting the specific time to be shorter than a re-reception time of the divided content if the divided content is received again from the external electronic device before the response message is transmitted.

14. The method of claim 10, wherein transmitting the content at the second speed comprises:
   dividing the content into a second specific unit;
   transmitting first divided content to the external electronic device;
   receiving a message in response to reception of the first divided content from the external electronic device; and
   transmitting second divided content if a second specific time elapses after the response message is received.

15. An electronic device comprising:
   a communication circuit;
   a display;
   a processor electrically connected with the communication circuit and the display; and
   a memory,
   wherein the memory stores instructions, which when executed by the processor, cause the processor to:
   verify a size of at least one content to be received from an external electronic device or to be transmitted to the external electronic device using the communication circuit;
   compare the size of the at least one content with a specific size;
   perform a first action associated with the transmission or the reception if the size of the at least one content is greater than or equal to the specific size, wherein the first action comprises transmitting or receiving the at least one content at a first speed; and
   perform a second action associated with the transmission or the reception if the size of the at least one content is less than the specific size, wherein the second action comprises transmitting or receiving the at least one content at a second speed, which is slower than the first speed,
   wherein the memory further stores instructions, which when executed by the processor, cause the processor to:
   receive divided content, which is generated by dividing the least one content into a specific unit, from the external electronic device; and
   transmit a message in response to the reception of the divided content after the divided content is received and a specific time elapses.

16. The electronic device of claim 15, wherein the instructions, when executed by the processor, cause the processor to:
   monitor at least one of a data usage allocated to the electronic device and a remaining amount of the data usage, and
   compare the size of the at least one content with at least one of the monitored data usage and the remaining amount of the data usage.

* * * * *